March 3, 1970
E. M. STEVENS
3,497,996
ADJUSTABLE, SELF-CLOSING, BUMP GATE
Filed Nov. 25, 1968
3 Sheets-Sheet 1
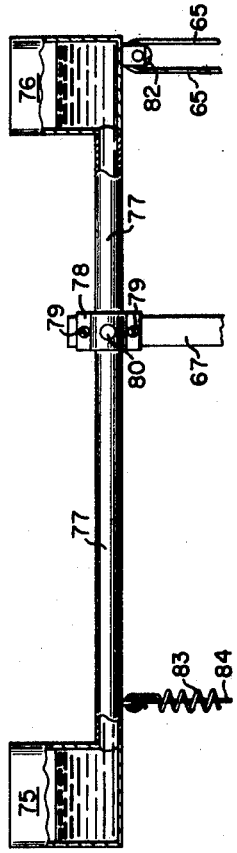
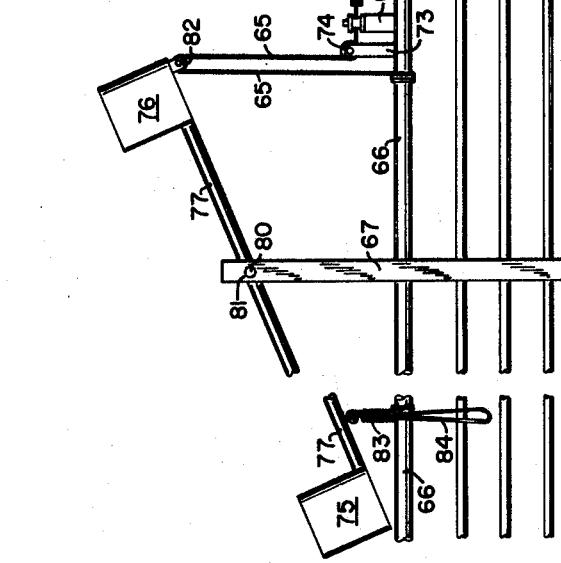
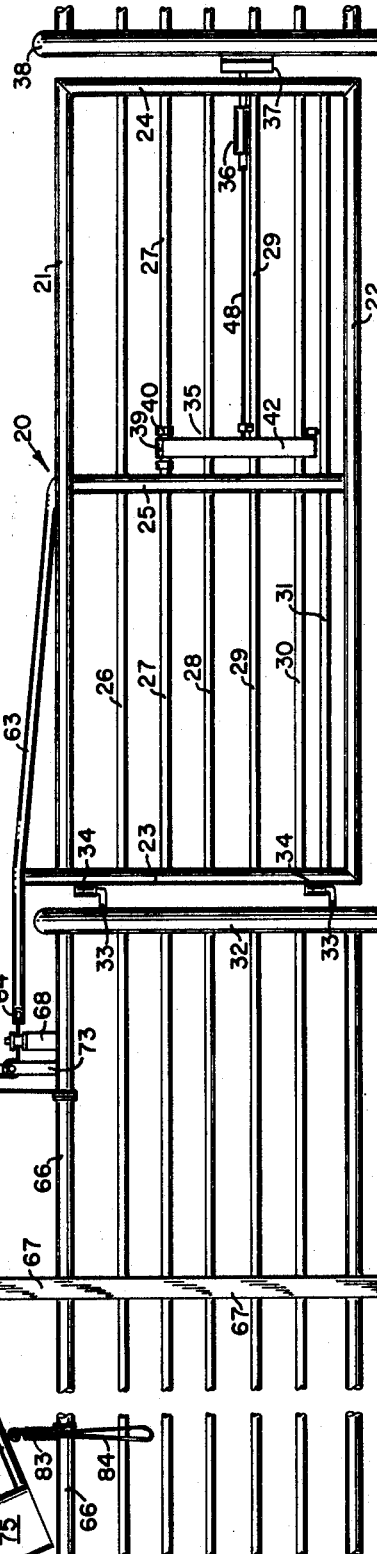
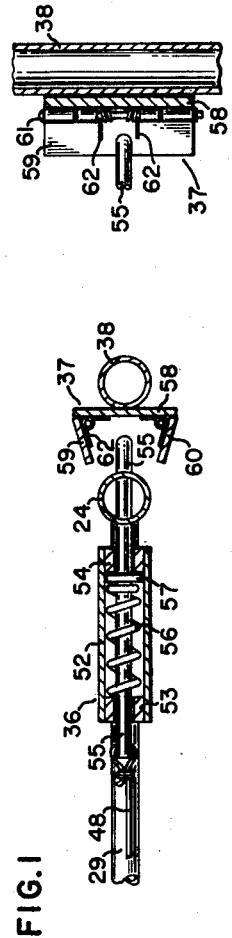
FIG. 1
FIG. 2
FIG. 3
FIG. 4
INVENTOR
ELBERT M. STEVENS
BY John C. Stahl
ATTORNEY March 3, 1970  E. M. STEVENS  3,497,996
ADJUSTABLE, SELF-CLOSING, BUMP GATE
Filed Nov. 25, 1968  3 Sheets-Sheet 2

INVENTOR
ELBERT M. STEVENS
BY John C. Stahl
ATTORNEY

March 3, 1970  E. M. STEVENS  3,497,996
ADJUSTABLE, SELF-CLOSING, BUMP GATE
Filed Nov. 25, 1968  3 Sheets-Sheet 3
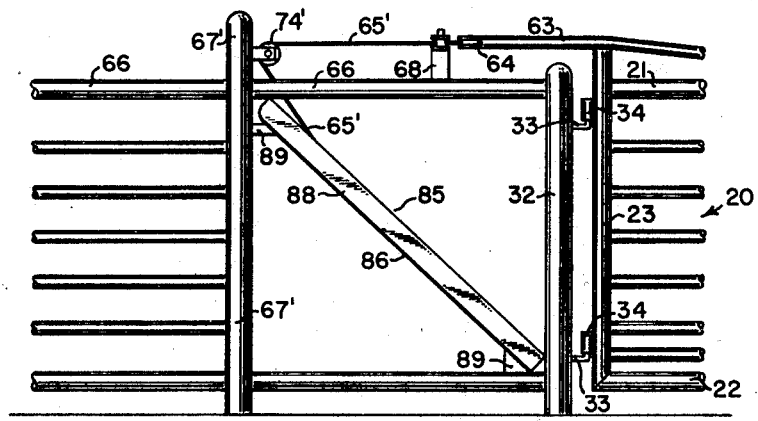
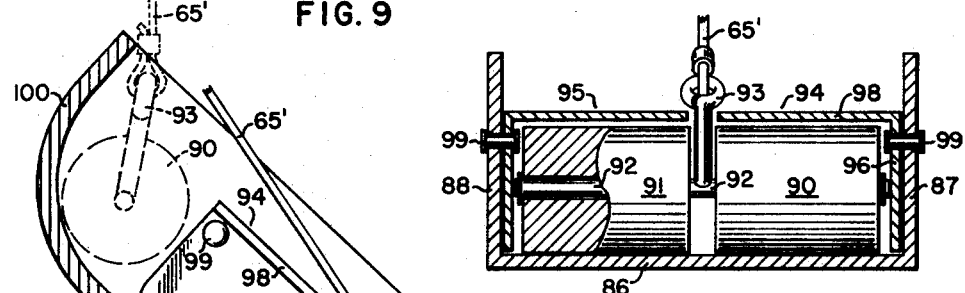
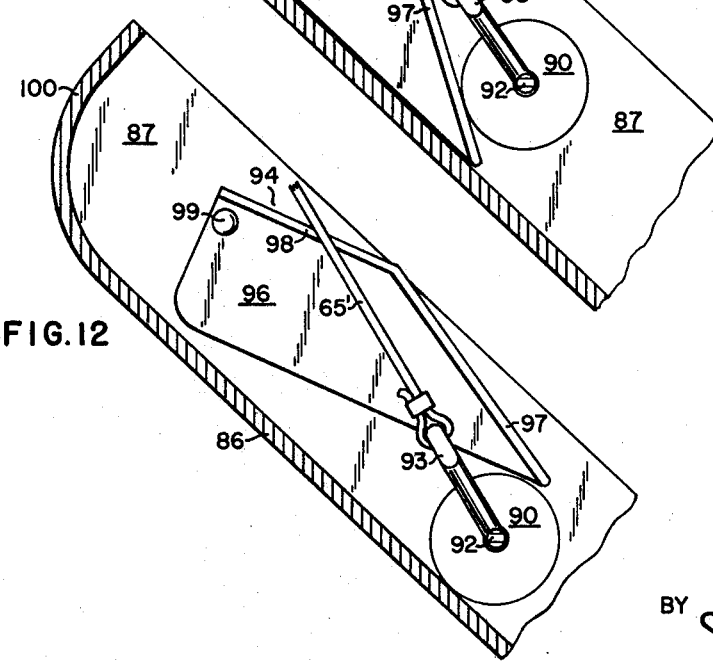
INVENTOR
ELBERT M. STEVENS
BY John C. Stahl
ATTORNEY United States Patent Office 3,497,996
Patented Mar. 3, 1970

3,497,996
ADJUSTABLE, SELF-CLOSING, BUMP GATE
Elbert M. Stevens, Box 157, Rte. 4,
Medina County, Tex. 78228
Filed Nov. 25, 1968, Ser. No. 778,604
Int. Cl. E06b *11/02;* E05f *1/02, 13/00*
U.S. Cl. 49—30                                    7 Claims

ABSTRACT OF THE DISCLOSURE

An adjustable, self-closing, bump gate including a striker bracket mounted thereon and adapted to be activated by the bumper of a vehicle, said bracket connected to coacting latch parts for said gate; spaced, liquid carrying containers in fluid flow relationship with a tubular member are pivotally mounted adjacent said gate whereby fluid flowing from one container through said tubular member to the second container closes the gate in a predetermined time interval.

---

The present invention relates to an adjustable, self-closing, bump gate and more particularly wherein such a gate, once open, is closed in a predetermined period of time.

A primary object of the invention is the provision of a bump gate activated by the bumper of a vehicle including means to regulate the time required to close said gate thereby preventing damage to the side of said vehicle by said gate.

Another object is to provide such a device which is of rugged construction, easy to service and maintain, and universal in its adaptability.

Other objects and features of the invention will become apparent to those skilled in the art as the disclosure is made in the following detailed description of preferred embodiments of the invention as illustrated in the accompanying sheets of drawing in which:

FIG. 1 is a front elevational view, partly broken away, of the preferred embodiment of the subject invention.

FIG. 2 is a fragmentary, slightly enlarged, front elevational view, partly broken away and partly in section, of the upper portion of the gate closing means of the embodiment of FIG. 1.

FIG. 3 is a greatly enlarged, horizontal sectional view, taken through the coacting latch parts secured to the gate and an adjacent post, as utilized in the subject invention.

FIG. 4 is a greatly enlarged, vertical sectional view, taken through the medial plane of the coacting latch part secured to the adjacent post.

FIG. 9 is a fragmentary, front elevational view of another embodiment of the subject invention.

FIG. 10 is a greatly enlarged view, partly in elevation and partly in transverse section showing the gate closing means associated with the embodiment of FIG. 9.

FIG. 11 is a greatly enlarged, vertical sectional view through the upper portion of the embodiment of FIG. 9 taken along the medial, longitudinal axis thereof showing the gate closing means in one position.

FIG. 12 is a greatly enlarged, vertical sectional view through the upper portion of the embodiment of FIG. 9 taken along the medial, longitudinal axis thereof showing the gate closing means in a second position.

Figure 5:
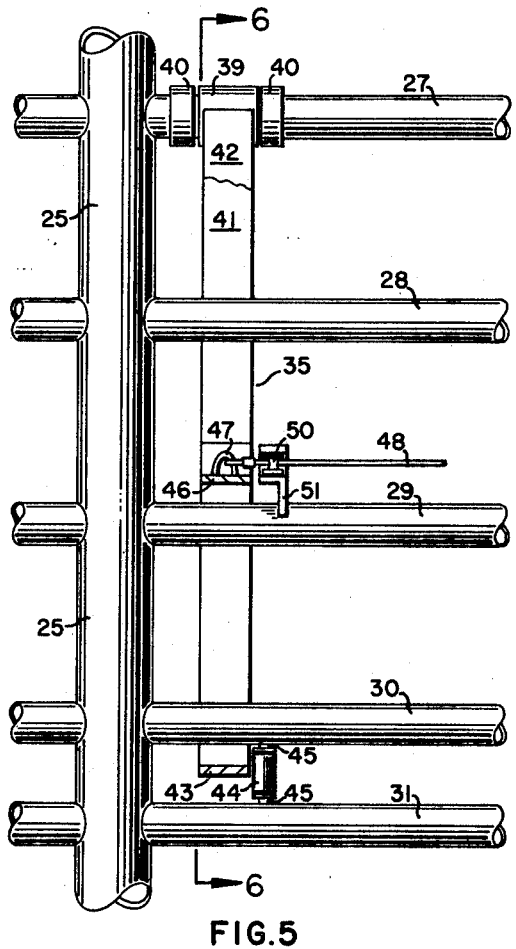
FIG. 5 is a fragmentary, greatly enlarged, front elevational view, partly broken away and partly in section, of the medial portion of the gate of the subject invention.

Referring now to the drawings, wherein like reference characters designate like or corresponding parts throughout the several views, there is shown in FIGS. 1–8 a preferred embodiment of bumper gate 20 of the subject invention, which gate is of desired height and length. Gate 20 consists of top and bottom, horizontally extending and vertically spaced rail members 21–22 secured outwardly to vertically extending end members 23–24 with vertical member 25 intermediate the ends; preferably end member 23 terminates above top rail 21.

A plurality of horizontally extending and vertically spaced bars 26–31 are secured to members 23–25, respectively. It is to be understood that gate 20 thus formed may be constructed of tubular or solid stock and bracing may be provided between such parts, in a conventional manner.

Gate 20 is pivotally mounted on post 32 by means of vertically spaced, L-shaped pins 33 carried on the squid post which insert into rings 34 on end member 23 of the said gate.

Figure 6:
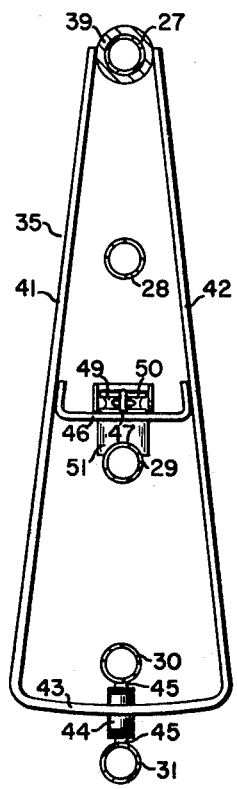
FIG. 6 is a vertical sectional view, taken on the line 6—6 of FIG. 5 looking in the direction of the arrows.

As viewed in FIGS. 5–6 of the drawings, striker bracket 35 is pivotally mounted on a selected bar 27 in proximity to and outwardly of member 25, the said striker bracket is remotely connected to latch part 36 on the gate with coacting latch part 37 on post 38, respectively. Bracket 35 is adapted to be activated from either side of gate 20 by means of the bumper of a vehicle or the like pressing thereagainst.

More specifically, collar 39 is carried on bar 27 and maintained in proximity to member 25 by means of stops 40. Legs 41–42 of substantial width are secured upwardly to collar 39, the said legs extend downwardly and outwardly with transversely extending, intermediate portion 43 concavely curved to pass between bars 30, 31 when the said bracket is pivoted. Vertically extending roller 44, carried on pin 45 secured to bars 30–31, abuts the outer side of portion 43 of said bracket and prevents the said bracket from being pulled outwardly.

Transversely extending support 46 passes over bar 29 with each end conventionally secured to legs 41, 42 of bracket 35, respectively; eye 47 or the like is secured to said support and one end of cable 48 fixedly attached thereto. Spaced and transversely aligned pulleys 49–50 are mounted on bracket 51 which is secured to bar 29 in proximity to bracket 35; cable 48 passes between the said pulleys and is adapted to partially pass around one of said pulleys when the bracket is activated.

As viewed in FIGS. 1 and 3 of the drawings, latch part 36 is secured to the outer end of bar 29 adjacent end member 24; said latch consists of cylindrical casing 52 with bushings 53–54 secured in opposite ends thereof with pin 55 passing axially therethrough. Compression spring 56, carried on pin 55, bears against bushing 53 and flange 57 on pin 55; in normal condition spring 56 forces flange 57 against bushing 54 and the outer end of pin 55 extends through aligned bores (not shown) in end member 24 and coacts with latch part 37. Cable 48, heretofore mentioned, is drawn taut and the remote end secured to the inner end of pin 55 in a conventional manner.

Coacting latch part 37, secured to post 38 as illustrated in FIGS. 3–4 of the drawings, consists of vertically and transversely extending backing plate 58 to which vertically and slightly inturned plates 59–60 are hingedly secured by means of pin 61. The ends of torsion spring 62 carried on pin 61 bears against the inner surface of the said plates 58–60, respectively, to maintain plates 59, 60 in extended condition; plates 59, 60 are stopped from rotating outwardly by means of the rear, vertical edge of the said plates abutting backing plate 58.

When striker bracket 35 is pushed by the bumper of a vehicle or the like, cable 48 attached thereto partially passes around a selected pulley 49, 50 dependent upon the direction from which bracket 35 is being activated thereby retracting pin 55 from between plates 59, 60 at which time the gate may be opened. When the force against the respective leg of the striker bracket is released, spring 56 not only causes pin 55 to assume the extended position of FIG. 3 but also aids in returning the striker bracket to the position illustrated in FIG. 6 of the drawings. In closing the gate, the outer portion of pin 55 bears against the outer surface of one of the plates 59, 60 causing the said plate to rotate inwardly against the force applied by spring 62; said pin is stopped by the other plate which does not pivot outwardly at which time the gate is in closed and locked condition.

Referring again to FIG. 1 of the drawings, there is shown means whereby gate 20, once opened in the manner heretofore described, is closed, at a predetermined rate. More specifically, member 63 is secured at one end to top rail 21; the said member extends angularly upward, is secured to the top of end member 23, and then extends horizontally, terminating in horizontally extending, arcuate segment 64 which is of channel or semi-circular stock, opening outwardly. One end of cable 65 is conventionally secured to the center of segment 64; it is to be understood that when segment 64 is rotated in a manner hereinafter to be described, cable 65 will partially lie in said channel or semi-circular portion dependent upon the direction in which gate 20 is pivoted.

Horizontal rail member 66, preferably lying in a common plane with top rail 21, is secured intermediate post 32 and post 67 spaced outwardly thereof; post 67 extends substantially above posts 32, 38. Bracket 68 is secured to rail member 66 outwardly of post 32 with flat, horizontal plate 69 secured to the upper end thereof. As viewed in FIG. 7 of the drawings, spaced and transversely aligned pulleys 70-71 are mounted between plate 69 and a second plate 72 of conforming configuration (see FIG. 8).

Figure 7:
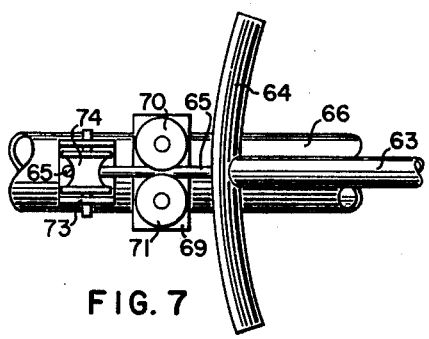
FIG. 7 is a fragmentary, greatly enlarged, top plan view showing a portion of the closing means associated with the gate wherein said gate is in closed condition.
Figure 8:
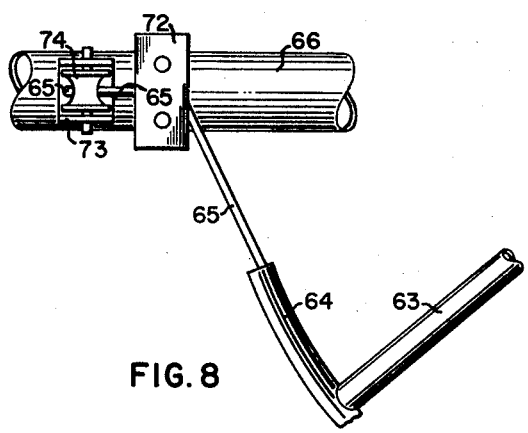
FIG. 8 is a fragmentary, greatly enlarged, top plan view showing a portion of the closing means associated with the gate wherein said gate is partially open.

Bracket 73, secured to rail member 66 outwardly of bracket 68, includes vertically and longitudinally aligned pulley 74 conventionally mounted thereon. As heretofore mentioned, one end of cable 65 is secured to the center of segment 64. When gate 20 is in closed condition, as illustrated in FIG. 7, cable 65 passes between pulleys 70, 71 and thence under and partially around pulley 74. When the gate is partially open, illustrated in FIG. 8, the said cable lies in the channel of segment 64, extends angularly inward, passes partially around pulley 71 and thence under and partially around pulley 74.

In the preferred embodiment of FIG. 1 of the drawings, vented containers 75-76 of desired configuration and capacity are secured in proximity to their respective bottoms to the ends of and communicate with tubular member 77 of desired inside diameter and length. Pipe bands 78 including securing means 79 are adjustably positioned and fastened on member 77; outwardly extending studs 80 on the said bands pass through aligned bores 81 in the upper portion of post 67. Cable 65, heretofore mentioned, passes over and partially around pulley 82 mounted on the bottom of container 76; the remote end of cable 65 is conventionally secured to rail member 66.

In the preferred embodiment, bands 78 are secured to member 77 off center wherein the distance from the center of container 75 to stud 80 is substantially greater than the corresponding distance to container 76; the ratio of such distances may range from 1.5–4::1.

It is to be understood that containers 75, 76 may be sealed to minimize loss by evaporation of the liquid therein. In one such modification, a tubular member (not shown) paralleling and spaced above member 77 connects to top or upper side wall portions of the respective containers and serves as an air tube or the like. Alternatively, a tube of reduced diameter may pass through the bore of tubular member 77 with standpipes communicating therewith which terminate upwardly in proximity to the top of each container to permit passage of air between the respective containers.

Tension spring 83 and cable 84 are secured to tubular member 77 in proximity to container 75 and downwardly to rail member 66, respectively. Cable 84 is of sufficient length to prevent over-extension of spring 83 when gate 20 is completely open.

In operation, liquid of desired viscosity is placed in containers 75, 76. When the gate is in closed and latched condition (see FIG. 1), the lower edge of container 75 is often supported by rail member 66. As gate 20 is opened in either direction, that portion of member 63 outwardly of the pivot point acts as a lever arm drawing cable 65 through the respective pulleys and applying a downward force on container 76. During such operation, liquid, seeking its own level, flows from container 75 through tubular member 77 into container 76. When gate 20 is completely open, tubular member 77 is horizontal and the liquid is at the same level in both containers, illustrated in FIG. 2 of the drawings.

Generally speaking, at such time the vehicle has had sufficient time to pass through the gate and the closing action is initiated; tension spring 83 either singly or in combination with the liquid in container 75 acting through its greater distance from the fulcrum exerts a downward force on container 75 whereby the liquid in container 76 flows through tubular member 77 into container 75. As container 75 is descending, cable 65 passing over pulley 82 applies a pulling force on segment 64 of end member 63 closing the said gate.

The time interval required to permit a vehicle to pass through gate 20 may be varied by providing containers 75, 76 with a liquid of different viscosity; a valve (not shown) may be provided in tubular member 77 to regulate the flow of liquid or a tubular member having a larger or smaller inside diameter may be utilized. Obviously, more viscous fluids, a smaller ratio between the arms of tubular member 77, or a smaller effective inside diameter thereof will increase the time interval required to close the gate.

There is shown in FIGS. 9–12 another embodiment of the invention consisting of an angularly inclined, U-shaped channel 85 of desired length including bottom 86 with spaced and upstanding sides 87–88; channel 85 is secured by means of gussets 89 between post 32 and post 67' spaced outwardly thereof. Pulley 74' is secured to post 67' above rail member 66 with cable 65' passing over, partially around the said pulley and thence angularly downward. Cylindrical weights 90–91 are rotatably mounted on axle 92; the remote end of cable 65' is secured to eye 93 which connects to the said axle intermediate weights 90, 91.

As best seen in FIGS. 10–12, ramps 94–95 are pivotally mounted in the upper portion of channel 85. For purposes of convenience only, ramp 94 will be described in detail, it is understood that ramp 95 is a mirror image thereof. Ramp 94 is of integral construction consisting of vertically extending side 96 with inclined surface 97 and horizontal surface 98 extending inwardly thereof, such surfaces terminate laterally of the medial, longitudinal axis of channel 85. Rivet 99 passes through the upper, rearmost side 96 of ramp 94 and side 87 of the channel whereby the said ramp 94 may pivot upwardly.

When gate 20 is closed, weights 90, 91 are positioned in proximity to the lower end of channel 85; when the said gate is opened in either direction, the said weights are pulled upwardly. Gate 20 is approximately two-thirds open when weights 90, 91 approach ramps 94, 95 as illustrated in FIG. 11. By requiring the said weights to be pulled up the greater inclination of surface 97 the outward movement of gate 20 is slowed; the weights roll on horizontal surface 98 and when falling off the upper end thereof provide the necessary momentum to initiate closure of the said gate. The upper end 100 of channel 85 is desirably concavely curved.

As shown in FIGS. 10 and 12 of the drawings, weights 90, 91 roll downwardly beneath ramps 94, 95 with eye 93 and cable 65' attached thereto extending upwardly between the innermost edges of horizontal surface 98 and inclined surface 97, respectively. Said weights, bearing against the undersurface of inclined portion 97 causes the said ramp to pivot upwardly, as illustrated in FIG. 12. Weights 90, 91 remotely connected to segment 64 of member 63 will pull the gate closed in the manner heretofore described.

The time interval required to close gate 20 is controlled by varying the angle of inclination of channel 85 and weights 90, 91 carried therein. It is understood that the upper end of channel 85 may be positioned adjacent post 32 while the lower end is in proximity to post 67' and additional pulleys provided.

What is claimed is:

1. A bump gate adapted to be positioned between spaced first and second posts comprising spaced top and bottom rails, spaced first and second end members secured to said top and bottom rails, at least one bar between said top and bottom rails and secured to said rail members, said gate pivotally mounted on said first post, a striker bracket pivotally mounted on said bar, a latch part secured to said gate in proximity to said second end member and adapted to engage a coacting latch part secured to said second post, said striker bracket connected to said latch part, an elongated member secured to said top rail and terminating laterally of said gate, a third post positioned laterally of said first post, a tubular member pivotally mounted on said third post, first and second containers secured downwardly to and communicating with said tubular member, a liquid in at least said first container, means connecting said second container to said elongated member whereby said second container is drawn downwardly and liquid flows into said second container when the gate is opening, said liquid is at the same level in both containers when the gate is open, and said gate is pulled closed by said liquid flowing into said first containers.

2. The invention of claim 1 wherein a valve is placed in said tubular member.

3. The invention of claim 1 wherein said first and second containers are sealed and an air tube connects to the upper portions of said first and second containers.

4. The invention of claim 1 wherein a tube of reduced diameter passes through said tubular member and a communicating standpipe in each container terminates above the liquid level therein.

5. The invention of claim 1 wherein said tubular member is pivotally mounted off center and the distance between said first container and the pivot is greater than the distance between said pivot and said second container.

6. A bump gate adapted to be positioned between spaced first and second posts comprising spaced top and bottom rails, spaced first and second end members secured to said top and bottom rails, a plurality of spaced bars between said top and bottom rails and secured to said end members, said gate pivotally mounted on said first post, a striker bracket pivotally mounted on one of said plurality of bars in proximity to the center of said gate, a latch part secured to one of said plurality of bars in proximity to said second end member and adapted to engage a coacting latch part secured to said second post, an elongated member secured at one end to said top rail, an arcuate outwardly opening channel secured to the opposite end of said elongate member, a third post positioned laterally of said first post, a tubular member pivotally mounted on said third post, first and second sealed containers secured downwardly to and communicating with said tubular member, a liquid in at least said first container, an air tube communicating with said containers above the liquid level therein, a cable connecting at one end to said second container and at the opposite end to said arcuate channel whereby said second container is drawn downwardly and liquid flows into said second container when said gate is opening, said liquid is at the same level in both containers when the gate is open, and said gate is pulled closed by said liquid flowing into said first container.

7. A bump gate adapted to be positioned between spaced first and second posts comprising spaced top and bottom rails, spaced first and second end members secured to said top and bottom rails, a plurality of spaced bars between said top and bottom rails and secured laterally to said end members, said gate pivotally mounted on said first post, a striker bracket pivotally mounted on one of said plurality of bars in proximity to the center of said gate, a latch part secured to one of said plurality of bars in proximity to said second end member and adapated to engage a coacting latch part secured to said second post, an elongated member secured at one end to said top rail, a transversely extending arcuate and outwardly opening channel secured to the opposite end of said elongated member, a third post positioned laterally of said first post, a tubular member mounted off center on said third post, first and second sealed containers secured downwardly to and communicating with said tubular member, a liquid in at least said first container, an air tube communicating with said first and second containers, a horizontally extending bar secured intermediate said first and third posts, first and second transversely aligned and spaced pulleys mounted on said horizontally extending bar, a cable secured at one end to said channel, said cable passing between said first and second pulleys, a third pulley secured to said horizontally extending bar laterally of said pulleys, said cable partially passed around said third pulley and attaching to said second container whereby said second container is drawn downwardly and liquid flows into said second container when the gate is opening, said liquid is at the same level in both containers when the gate is open, and said gate is pulled closed by said liquid flowing into said first container.

References Cited

UNITED STATES PATENTS

| | | | |
|---|---|---|---|
| 521,993 | 6/1894 | Savage et al. | 49—30 X |
| 1,563,266 | 11/1925 | Durham | 49—21 X |
| 1,596,388 | 8/1926 | Barnhart | 49—364 X |
| 2,131,415 | 9/1938 | Woodward | 49—23 |
| 2,861,366 | 11/1958 | Dension | 39—265 X |
| 3,429,074 | 2/1969 | Horton | 49—30 X |

DENNIS L. TAYLOR, Primary Examiner

U.S. Cl. X.R.

49—264, 386